May 19, 1931. R. R. CRUM 1,805,808
BOOSTER BRAKE DEVICE
Filed Feb. 12, 1930 2 Sheets-Sheet 2

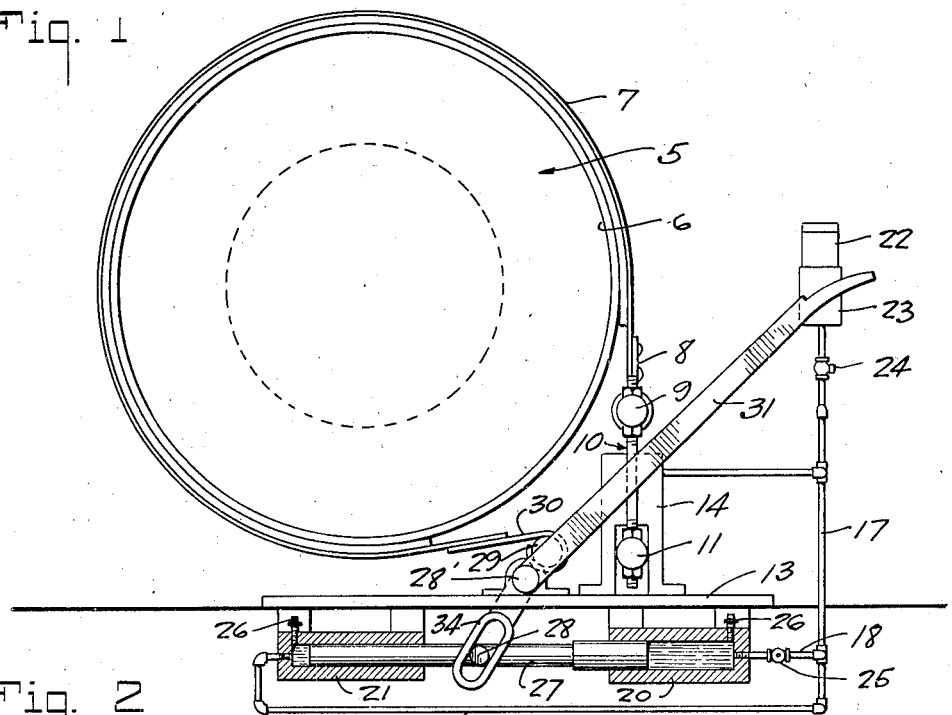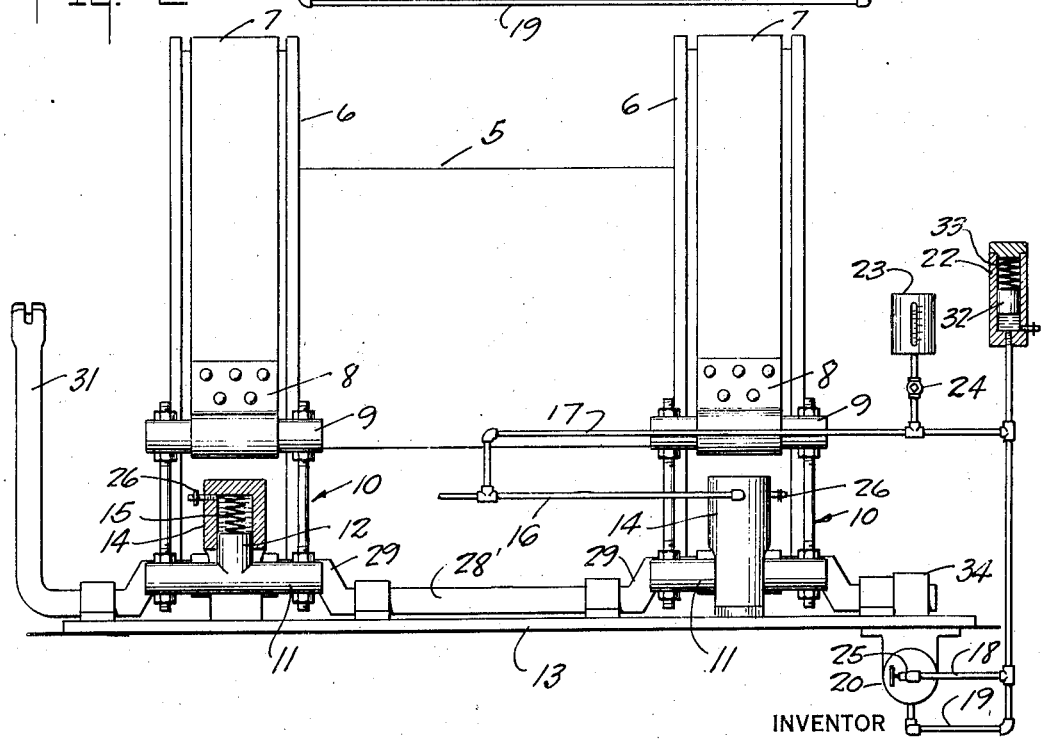

INVENTOR
Roland R. Crum
BY
Westall and Wallace
ATTORNEYS

Patented May 19, 1931

1,805,808

UNITED STATES PATENT OFFICE

ROLAND R. CRUM, OF WHITTIER, CALIFORNIA

BOOSTER BRAKE DEVICE

Application filed February 12, 1930. Serial No. 427,721.

This invention relates to a brake mechanism having features adapting it to use on brake drums of rotary draw works as used in drilling oil wells, but not limited to such use.

In rotary drilling of well holes, it is the current practice to lower and raise pipe by means of a draw works comprising a drum serving as a hoisting drum upon which a hoisting cable is wound and unwound. The cable is secured to the pipe. In the case of deep holes, the weight of the pipe causes a heavy strain upon the drum. The lowering of the pipe is controlled by brakes. These brakes comprise together with the drum, a shoe or shoes, such as brake bands. The dead end of the shoe is anchored to a substantially stationary support and the brake is applied by operation upon the live end. The operating beam is commonly a manually operated lever. In order to apply sufficient force to the application of the shoes, the end of the lever which is manually swung must have a comparatively great movement in order to multiply the force applied. It has been attempted to provide mechanical motions which would decrease the overall swing of the lever and multiply the force applied at the instant of brake application. It has been found that upon release of the brake there is a tendency of the live end to follow the dead end resulting in a kick back on the lever often resulting in injury to the operator. A desirable feature in a brake is the equalization of braking effort between several brakes. In common practice, two brakes are used and operated by a single lever. If too much of the work of braking is performed by one of the brakes, serious trouble may result. In such cases, one brake becomes excessively hot and also the associated brake drum, weakening the drum and often resulting in the latter flying to pieces.

The objects of this invention are to provide a brake mechanism having any or all of the following features: Booster mechanism operated by the dead end of a brake shoe and transferring the force tending to move it about the drum to the operating means so as to aid in applying the shoe; a booster mechanism as described wherein the tendency of the live end to kick back is checked; and a brake mechanism wherein the braking effort is equalized between several shoes.

These objects together with other objects and corresponding accomplishments are obtained by means of the embodiment of my invention illustrated in the accompanying drawings, in which:—

Figure 3:
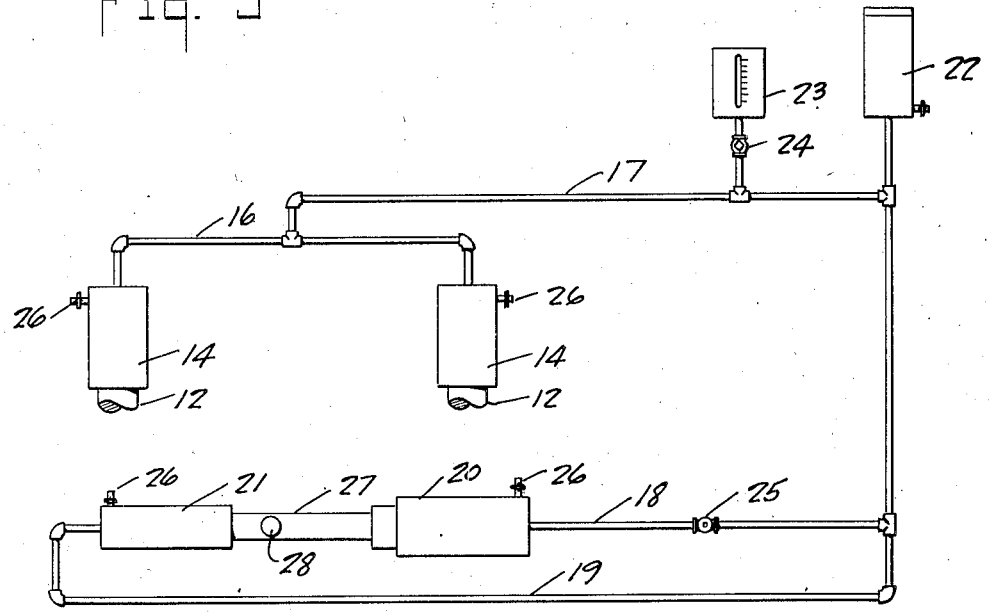
Figure 4:
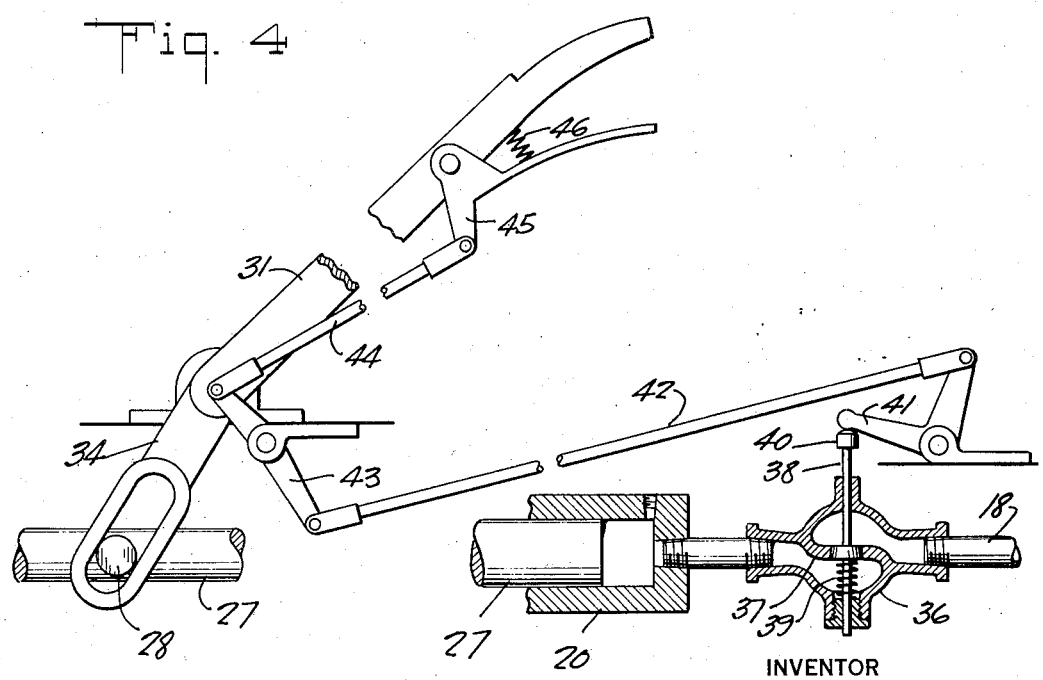

Fig. 1 is a side view partly in section showing in a conventional manner a draw works drum with the booster brake mechanism applied thereto; Fig 2. is a face view; Fig. 3 is a schematic view of the fluid transmission system and associated parts; and Fig. 4 is a detail view partly in section showing a booster with a check valve to retain the brake in applied position.

Referring more particularly to the drawings, a draw-works drum is denoted by 5. The drum 5 has at its opposite end brake flanges 6 carrying brake bands 7. Eyes 8 are secured to the dead ends of the bands and receive pins 9 forming parts of yokes 10. The yokes 10 comprise cross members 11 provided with plungers 12.

Mounted upon the base 13 are operator cylinders 14 to receive the plungers 12 and form therewith expansible chambers. In the operator cylinders are compression springs 15 for retracting the plunger. A pipe line 16 places the cylinders 14 in communication. A branch pipe line 17 is connected to line 16 and communicates through lines 18 and 19 with booster chambers 20 and 21 respectively. Connected to the pipe line 17 is an accumulator chamber 22 and a reservoir chamber 23. Reservoir chamber 23 is closed by a valve 24 whereby fluid may be supplied to the system to make up for losses as desired. Other valves may be provided for adjusting the flow of fluid from the booster to the operator chambers, as for illustration, valve 25 which may be adjusted to restrict the orifice formed in the valve seat and retard the flow of fluid. It is obvious that the size of the orifices of the pipes or any particular element thereof may be designed to obtain the retardation desired. By these means the kick back of the live end is checked. Safety relief valves 26 may also be placed on the cylinders. Such valves form no part of the present invention and may be employed as found expedient.

The booster comprises cylinders 20 and 21, the bore of cylinder 20 being greater than that of cylinder 21. A plunger 27 has ends operating in cylinders 20 and 21 and is provided intermediate its ends with a stud pin 28. The booster cylinders and plunger comprise a differential expansive chamber.

The operating mechanism for the live ends of the brake band comprises a rock shaft 28' journalled on base 13 and having wrists 29, one for each brake band. The live ends of the brake bands have eyes 30 disposed about the wrists. The rock shaft is extended at one end to provide a manually operable lever 31 for rocking the shaft. Assuming that the transmission conduit, cylinders and accumulator chamber have been filled with a liquid, such as oil, so that floating plunger 32 in accumulator chamber may have movement, there being a compression spring 33 in the accumulator chamber and valve 24 is closed, the operation is as follows:

Upon swinging lever 31 to tighten the brake bands, the wrists 29 will swing to apply a pull to the live ends of the bands. This will cause a tendency of the dead ends of the bands to follow the live ends and pressure to be exerted upon the fluid in the transmission system due to the plungers 12 exerting pressure upon the liquid in cylinders 14. Obviously, the applied force is distributed between the two brake bands. The pressure of fluid in cylinders 14 is transmitted to the fluid transmission conduit and to booster cylinders 20 and 21. Booster cylinder 20 being larger than cylinder 21 acts upon the plunger 27 tending to move the latter toward the left. An arm 34 is secured to the rock shaft and is provided with an elongated slot which receives the stud pin 28. Movement of the plunger 27 to the left acts upon the arm 34 tending to rock the shaft 28 and thereby aid in the application of the brakes. Due to the differential action in cylinders 20 and 21 the amount of fluid displacement with respect to the operator cylinder is minimized. Cylinder 21 is in effect an accumulator. Upon release of the brake, there will be a pull upon the live ends due to the frictional contact between the brake bands and their shoes tending to cause the bands to follow the drums. This would result in a kick back which in the present structure is checked by the resistance of the liquid in the cylinders and conduits of the system and may be controlled by the amount of opening of valve 25.

It may be desirable to hold the brake in applied position and the structure shown in Fig. 4 will accomplish this purpose. A valve 36 is substituted for valve 25. It comprises a casing having a ported wall for a valve 37. The valve is arranged to close against the outflow of liquid in cylinder 20 and has a stem 38. A compression spring 39 tends to seat valve 37. Stem 38 has a head 40 engaged by a rock lever 41 pivoted upon a stationary support. A link rod 42 connects the lever 41 with a rock lever 43 pivotally mounted upon a stationary support. The other arm of lever 43 is connected by a rod 44 to a hand operated lever 45 pivotally mounted upon the main lever 31. A compression spring 46 tends to maintain the linkage in such a position that rock lever 41 is disposed so that valve 37 may be seated. By gripping the rock lever 45 and the handle of the main lever 31 so as to move the linkage, the rock lever 41 may be moved against the head 40 of the valve stem so as to unseat valve 37. In the operation of the mechanism last described, the brakes may be applied by swinging the main lever 31 which will cause fluid to be displaced and pass into the bore of booster cylinder 20. Such flow is permitted by reason of the valve 37 acting as a check valve. During such operation the rock lever 45 will be allowed to remain in the position shown in Fig. 4. After the brake has been applied, it will be maintained in applied position as fluid cannot pass outwardly from the bore of cylinder 20 unless valve 37 is unseated. Unseating of the valve is positively effected by operating the rock lever 45 which enables unseating of valve 37 and the restoration of the several parts of the mechanism to release position.

What I claim is:—

1. A brake mechanism comprising a brake drum, a brake shoe for said drum having a live end and a dead end, operating means secured to the live end of said shoe to apply the shoe to said drum; a fluid transmission system including an expansible chamber operator secured to the dead end of said brake shoe to cause displacement of fluid in the chamber of said operator on movement of the dead end of said shoe, an expansible chamber booster, fluid transmission means connecting the chambers of said operator and said booster, said booster being connected to said operating means to aid the application of the shoe to said drum.

2. A brake mechanism comprising a brake drum, a brake shoe for said drum having a live end and a dead end, operating means secured to the live end of said shoe to apply the shoe to said drum and having a manually operable lever for actuation of said means; a fluid transmission system including an expansible chamber operator secured to the dead end of said brake shoe to cause displacement of fluid in the chamber of said operator on movement of the dead end of said shoe, an expansible chamber booster, fluid transmission means connecting the chambers of said operator and said booster, said booster being connected to said operating means to aid the application of the shoe to said drum.

3. A brake mechanism comprising a brake drum, a brake shoe for said drum having a live end and a dead end, a rock shaft having manually operable means for rocking the same, means connecting said rock shaft to the live end of said shoe to apply the shoe to said drum; a fluid transmission system including an expansible chamber operator secured to the dead end of said brake shoe to cause displacement of fluid in the chamber of said operator on movement of the dead end of said shoe, an expansible chamber booster, fluid transmission means connecting the chambers of said operator and said booster, said booster being connected to said rock shaft to aid the application of the shoe to said drum.

4. A brake mechanism comprising a brake drum, a brake shoe for said drum having a live end and a dead end, operating means secured to the live end of said shoe to apply the shoe to said drum; a fluid transmission system including an expansible chamber operator secured to the dead end of said brake shoe to cause displacement of fluid in the chamber of said operator on movement of the dead end of said shoe, an expansible chamber booster, an accumulator chamber, fluid transmission means connecting the chambers of said operator, and said booster and said accumulator chamber, said booster being connected to said operating means to aid the application of the shoe to said drum.

5. A brake mechanism comprising a brake drum, a brake shoe for said drum having a live end and a dead end, operating means secured to the live end of said shoe to apply the shoe to said drum; a fluid transmission system including an expansible chamber having its moving part secured to the dead end of said brake shoe to cause displacement of fluid in said chamber on movement of the dead end of said shoe, a second expansible chamber, fluid transmission means connecting said chambers and retarding displacement of fluid from one chamber to the other, said second expansible chamber having its moving part connected to said operating means whereby to aid the application of the shoe to said drum and check the live end against following said drum.

6. A brake mechanism comprising a brake drum, a brake shoe for said drum having a live end and a dead end, operating means secured to the live end of said shoe to apply the shoe to said drum and having a manually operable lever for actuation of said means; a fluid transmission system including an expansible chamber having its moving part secured to the dead end of said brake shoe to cause displacement of fluid in said chamber on movement of the dead end of said shoe, a second expansible chamber, fluid transmission means connecting said chambers and retarding displacement of fluid from one chamber to the other, said second expansible chamber having its moving part connected to said operating means whereby to aid the application of the shoe to said drum and check the live end against following said drum.

7. A brake mechanism comprising a brake drum, a brake shoe for said drum having a live end and a dead end, a rock shaft having manually operable means for rocking the same, means connecting said rock shaft to the live end of said shoe to apply the shoe to said drum; a fluid transmission system including an expansible chamber having its moving part secured to the dead end of said brake shoe to cause displacement of fluid in said chamber on movement of the dead end of said shoe, a second expansible chamber, fluid transmission means connecting said chambers and retarding displacement of fluid from one chamber to the other, said second expansible chamber having its moving part connected to said rock shaft whereby to aid the application of the shoe to said drum and check the live end against following said drum.

8. A brake mechanism comprising a brake drum, a brake shoe for said drum having a live end and a dead end, operating means secured to the live end of said shoe to apply the shoe to said drum; a fluid transmission system including an expansible chamber having its moving part secured to the dead end of said brake shoe to cause displacement of fluid in said chamber on movement of the dead end of said shoe, a second expansible chamber, an accumulator chamber, fluid transmission means connecting said chambers and retarding displacement of fluid from one chamber to the other, said second expansible chamber having its moving part connected to said operating means whereby to aid the application of the shoe to said drum and check the live end against following said drum.

9. A brake mechanism comprising a hoisting drum, provided with a brake having a pair of brake shoes, each of said brake shoes having a live end and a dead end, operating means secured to the live ends of said shoes to simultaneously apply said shoes to said drum; a fluid transmission system including a pair of expansible chamber operators, one each of said operators being connected to the dead ends of said shoes to cause displacement of fluid in said chambers on movement of the dead ends of said shoes, an expansible chamber booster, and fluid transmission means connecting the chambers of said operators and said booster, said booster being connected to said operating means to aid the application of the shoes to said drum and equalize the braking effort between said shoes.

10. A brake mechanism comprising a hoisting drum, provided with a brake having a pair of brake shoes, each of said brake shoes having a live end and a dead end, operating means secured to the live ends of said shoes to simultaneously apply said shoes to said drum; a fluid transmission system including a pair of expansible chamber operators, one each of said operators being connected to the dead ends of said shoes to cause displacement of fluid in said chambers on movement of the dead ends of said shoes, an expansible chamber booster, an accumulator chamber, and fluid transmission means connecting the chambers of said operators and said booster and said accumulator chamber, said booster being connected to said operating means to aid the application of the shoes to said drum and equalize the braking effort between said shoes.

11. A brake mechanism comprising a hoisting drum, provided with a brake having a pair of brake shoes, each of said brake shoes having a live end and a dead end, operating means secured to the live ends of said shoes to simultaneously apply said shoes to said drum; a fluid transmission system including a pair of expansible chamber operators, one each of said operators being connected to the dead ends of said shoes to cause displacement of fluid in said chambers on movement of the dead ends of said shoes, an expansible chamber booster, fluid transmission means connecting the chambers of said operators and said booster and retarding displacement of fluid from the chamber of said booster, said booster being connected to said operating means to aid the application of the shoes to said drum and distribute the braking effort between said shoes.

12. A brake mechanism comprising a hoisting drum provided with a brake having a pair of brake shoes, each of said brake shoes having a live end and a dead end, operating means connected to the live ends of said shoes to simultaneously apply said shoes to said drum; a fluid transmission system including a pair of expansible chambers, one each of said chambers having its moving part connected to the dead end of a shoe to cause displacement of fluid in the chamber on movement of the dead end of the shoe, an expansible chamber booster, fluid transmission means connecting said expansible chambers and the chamber of said booster, manually controlled means to stop the displacement of fluid between the chamber of said booster and said expansible chambers, said booster having its moving part connected to said operating means whereby to aid the application of the shoes to said drum, distribute the braking effort between said shoes and check the live ends of said shoes from following said drum and enable locking of said brake.

13. A brake mechanism comprising a hoisting drum, provided with a brake having a pair of brake shoes, each of said brake shoes having a live end and a dead end, a manually operable rock shaft having wrists secured to the live ends of said shoes to simultaneously apply said shoes to said drum; a fluid transmission system including a pair of expansible chamber operators, one each of said operators being connected to the dead ends of said shoes to cause displacement of fluid in said chambers on movement of the dead ends of said shoes, an expansible chamber booster, and fluid transmission means connecting the chambers of said operators and said booster, said booster being operatively connected to said rock shaft to aid the application of the shoes to said drum and equalize the braking effort between said shoes.

14. A brake mechanism comprising a hoisting drum, provided with a brake having a pair of brake shoes, each of said brake shoes having a live end and a dead end, a manually operable rock shaft having wrists secured to the live ends of said shoes to simultaneously apply said shoes to said drum; a fluid transmission system including a pair of expansible chamber operators, one each of said operators being connected to the dead ends of said shoes to cause displacement of fluid in said chambers on movement of the dead ends of said shoes, an expansible chamber booster, an accumulator chamber, and fluid transmission means connecting the chambers of said operators and said booster and said accumulator chamber, said booster being connected to said rock shaft to aid the application of the shoes to said drum and equalize the brake effort between said shoes.

15. A brake mechanism comprising a hoisting drum, provided with a brake having a pair of brake shoes, each of said brake shoes having a live end and a dead end, a manually operable rock shaft having wrists secured to the live ends of said shoes to simultaneously apply said shoes to said drum; a fluid transmission system including a pair of expansible chamber operators, one each of said operators being connected to the dead ends of said shoes to cause displacement of fluid in said chambers on movement of the dead ends of said shoes, an expansible chamber booster, fluid transmission means connecting the chambers of said operators and said booster and retarding displacement of fluid from one chamber to another, said booster being connected to said rock shaft to aid the application of the shoes to said drum and distribute the braking effort between said shoes.

In witness that I claim the foregoing I have hereunto subscribed my name this 28th day of January, 1930.

ROLAND R. CRUM.